United States Patent [19]

Ikeda

[11] E Re. 30,231

[45] Reissued Mar. 18, 1980

[54] LENS SELECTION DEVICE

[75] Inventor: Hiroshi Ikeda, Aichi, Japan

[73] Assignee: Minolta Camera Kabushiki Kaisha, Osaka, Japan

[21] Appl. No.: 872,515

[22] Filed: Jan. 26, 1978

Related U.S. Patent Documents

Reissue of:

[64] Patent No.: 3,936,150
Issued: Feb. 3, 1976
Appl. No.: 533,920
Filed: Dec. 18, 1974

[30] Foreign Application Priority Data

Dec. 22, 1973 [JP] Japan ..... 49-2168[U]

[51] Int. Cl.[2] ..... G02B 15/04; G03B 27/40

[52] U.S. Cl. ..... 350/183; 355/60

[58] Field of Search ..... 350/38, 39, 183, 187, 350/254; 355/56, 57, 60

[56] References Cited

U.S. PATENT DOCUMENTS

| | | | |
|---|---|---|---|
| 2,985,070 | 5/1961 | Lane | 350/183 |
| 3,600,066 | 8/1971 | Del Vecchio | 350/187 X |

*Primary Examiner*—Paul A. Sacher
*Attorney, Agent, or Firm*—Wolder, Gross & Yavner

[57] ABSTRACT

A lens selection device for placing any one of three or more magnification lenses in an operative position where its optical axis aligns with a respective reference axis, a selected lens being shifted along a fixed path from a retracted position to the operative position thereof by separate drive means numbering one less than the quantity of the lenses. In the case of three lenses, for instance, a first drive means is used to shift a first lens, a second drive means is used to shift a second lens, and a follower means coupled with a third lens is used to shift it to its operative position when the first (or the second) lens is driven to its retracted position.

12 Claims, 5 Drawing Figures

LENS SELECTION DEVICE

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a lens selection device, and more particularly relates to a lens selection device suited for use in reproducing apparatus (e.g., an electrostatic photocopier) wherein a plurality of discrete magnification lenses are shifted perpendicular to a respective reference axis to vary the magnification of an image to be reproduced.

2. Discussion of the Prior Art

In general, various types of variable magnification devices for use in a reproducing apparatus are known. These include (1) a device in which a mirror and a lens are shifted; (2) a device in which a conversion lens is used to vary magnification of an image; (3) a device in which a zoom lens is used; and (4) a device in which a plurality of individual magnification lenses are arranged in serial fashion and shifted together to select a desired magnification.

These known devices present the following drawbacks, however. With the first-mentioned device, it is necessary to shift the mirror and lens. This renders the mechanism complicated. Should lens aberration deviate from a predetermined value, a balance between spherical aberration and astigmatism may not be maintained or there may result an increase in coma aberration. With the second-mentioned device, magnification chromatic aberration tends to arise as astigmatism increases. As to the third-mentioned device, a continuous zoom lens is costly, and if a step zoom lens is used, there result difficulties in control. As to the fourth-mentioned device, unlike the other devices, it is simple in mechanism and poses no problem with lens aberration, as each lens is suited for its intended magnification. This fourth device presents a problem, however, in that when three lenses are used they require a space large enough to arrange five lenses in a direction perpendicular to an optical axis—this being impractical when space available to accommodate the lenses in the reproducing apparatus is limited.

SUMMARY OF THE INVENTION

This invention provides a novel lens selection device that avoids the drawbacks of the aforesaid known devices and avoids in particular aforementioned difficulties experienced upon use of the fourth-mentioned device.

One object of the invention is to provide a lens selection device in which three or more individually selectable lens assemblies are shiftable between retracted and operative positions thereof by a plurality of drive means, each being coupled to a respective lens assembly and there being one less drive means than there are lens assemblies; and by a follower means engaging that lens assembly which is not coupled to a drive means. The various drive means and the follower means cooperate in such a way that only one lens assembly is in its operative position at any particular moment.

Another object of the invention is to provide an improved lens selection device in which three individually selectable lenses, each of a different magnification, are free to shift within a space just large enough for the lenses and their holders, selection of a lens being effected by operation of a mechanism of simple construction.

A selected lens is moved from a retracted position to an operative position by shifting it in a direction perpendicular to an optical axis in space, this axis being aligned with the principal axis of the selected lens and in a light path to a photo-sensitive member. The invented device uses only two drive means to shift individual ones of the three lenses and is therefore of simplified mechanical construction.

The lens selection device of one embodiment of the invention includes three magnification lenses each movable in a fixed path that intersects a reference axis (hereinafter referred to as optical axis L–L′), each lens being shiftable from a retracted position to an operative position where the principal axis of the lens coincides with its reference axis. Two of the lenses are shiftable by separate drive means, a first drive means being coupled with one of the lenses and a second drive means being coupled with another of the lenses. The third lens is coupled with a follower means that causes the third lens to follow the movement of either of the two driven lenses. The third lens is brought to its operative position when one of the other lenses is in its retracted position, and a second one of the other lenses is driven to its retracted position. The follower means includes a spring coupled with the third lens to urge it toward its operative position and stops affixed to the other lens assemblies, the stops being effective to hold the third lens in its retracted position when either of the other lenses is in its selected position.

Hereafter there will be given a description of a preferred embodiment of a lens selection device with reference to the accompanying drawings.

DESCRIPTION OF THE PREFERRED EMBODIMENT

Figure 1:
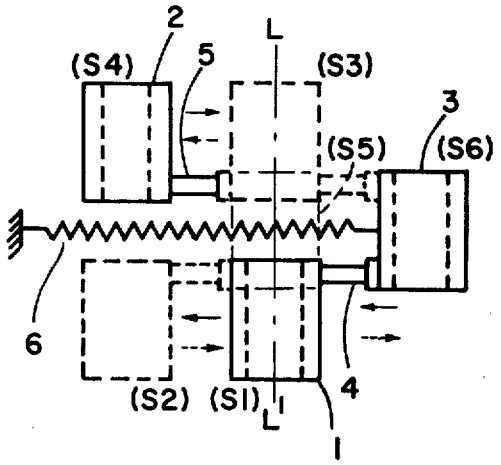
FIG. 1 is an explanatory view showing the operating principle of a lens selection device according to the present invention.

FIG. 1 is a schematic view illustrating the principle of the present invention. Two lenses 1 and 2 are free to shift between respective operative positions S1 and S3 and respective retracted positions S2 and S4, with a given spacing maintained between the lenses. These lenses shift in paths oriented at a right angle to a certain optical axis L–L′. Under the action of a spring 6, a third lens 3 is positioned in abutting relation to either or both of two stops 4 and 5 respectively attached to respective holders (best seen in FIGS. 3 and 4) of the aforesaid lenses 1 and 2 so that lens 3 may be shifted from a retracted position S6 to an operative position S5 on optical axis L–L′. Axis L–L′ is a spatial reference axis with which the principal axis of lens 1, lens 2, or lens 3 aligns when the respective lens is in its operative position. Lens 1 may, for example, be a uni-power lens (x1), lens 3 may, for example, be a first reduction lens (x0.785) and lens 2 may, for example, be a second reduction lens (x0.647).

If lens 2 is shifted to retracted position S4 and lens 1 is shifted to operative position S1, then by means of stop 4 the lens 3 is shifted to retracted position S6 against the tension of spring 6, and thus, the lens 1 alone is in an effective position—i.e., operative position S1.

Likewise, if lens 1 is shifted to retracted position S2 and lens 2 is shifted to operative position S3 on the reference axis L–L', the stop 5 holds lens 3 in its retracted position S6. If, however, lens 1 and lens 2 are both shifted to their retracted positions, S2 and S4, respectively, then lens 3 is shifted by spring 6 to its operative position S5.

Figure 2:
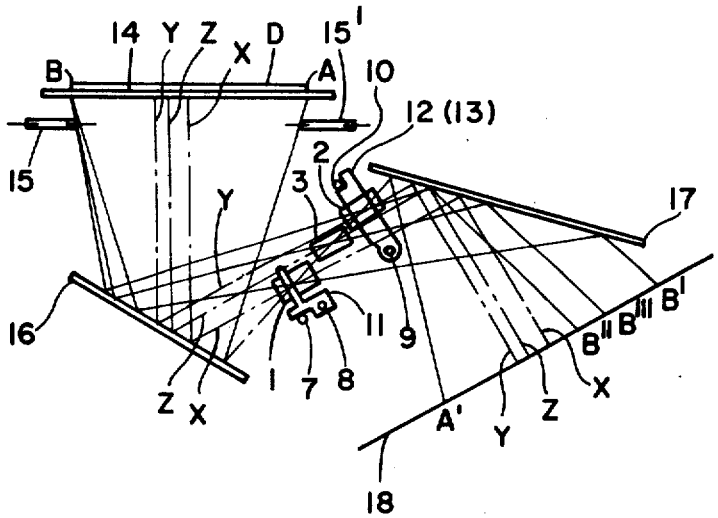
FIG. 2 is an explanatory view of an optical system for a reproducing apparatus that includes the lens selection device of the invention.

Reference will now be made to a reproducing apparatus containing a lens selection device T that embodies the above-described principle. In FIG. 2, shown at 14 is a glass sheet on which an original document D can be placed; at 15, 15' are lamps that illuminate the lower surface of the original document; at 16 is a first mirror and at 17 is a second mirror; and at 18 is a photo-sensitive member on which is formed a latent image conforming to an image on the document D. An optical image of document D—when illuminated by lamps 15, 15'—is reflected by mirror 16, focused by the selected one of lenses 1, 2, and 3 onto mirror 17, where it is reflected onto photo-sensitive member 18 to form a latent image thereon. Lenses 1, 2, 3 may be set up as shown in FIG. 2 so that the optical axis X of lens 1, the optical axis Y of lens 2, and the optical axis Z of lens 3 are parallel, any one lens being shiftable to an operative position where the optical axis of such lens aligns with a respective reference axis which is not coincident with the reference axes associated with the other lenses, the reference axis being so located that (a) one end A of the document D registers on a common reference line A' on the surface of member 18 irrespective of which lens 1, 2 or 3 has been selected and (b) the other end B of document D registers on a reference line B', B'' or B''' on the surface of member 18 depending on the lens selected.

Alternatively, lenses 1, 2 and 3 may be set up so that the principal axis of each lens can be aligned with a single reference axis L–L' (such as shown in FIG. 1) when positioning that lens in its operative position.

In device T, lens 1 and its holder 11 (the combination of a lens and its holder being referred to hereinafter as a "lens assembly") are slidably mounted on rails 7 and 8 (see FIGS. 3, 4) supported by side walls of the device frame. Lens 1 is attached by a fastening means 19 to an endless wire 20 trained about pulleys 21 and 21', one of these pulleys (21) being driven by a reversible motor M1. Rail 7 (see FIGS. 2 and 4) contacts the underside of lens holder 11, and rail 8 passes through a guide hole formed in holder 11.

Lens 2 and its holder 12 and lens 3 and its holder 13 (see FIGS. 3, 4) are slidably mounted on rails 9 and 10 supported by the side walls of the device frame. Lens 2 is attached by a fastening means 22 to a wire 23 trained about pulleys 24 and 24', one of these pulleys (24) being driven by a reversible motor M2. Lens 3 is attached to a tension spring 6 secured to a side wall of the frame. Lens 3 is therefore normally urged by spring 6 toward the lenses 1 and 2. Rail 9 passes through guide holes formed in holders 12 and 13. Rail 10 engages the surfaces of lens holders 12 and 13, as shown in FIGS. 2 and 3.

Figure 3:
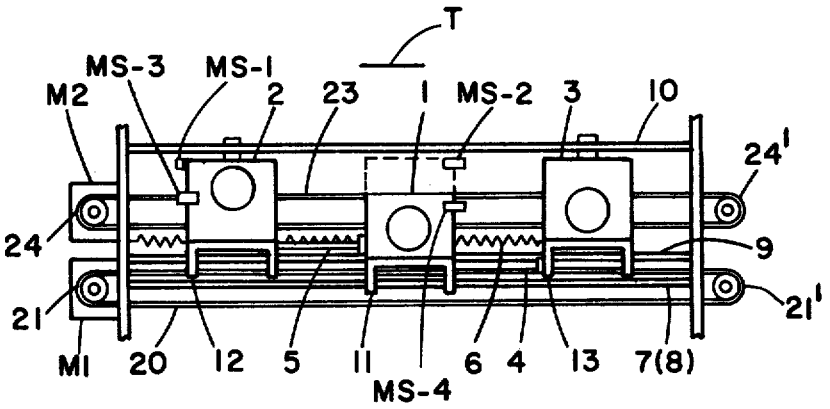
FIG. 3 is a front elevation drawing of the lens selection device, as viewed in the direction of an optical axis L–′.
Figure 4:
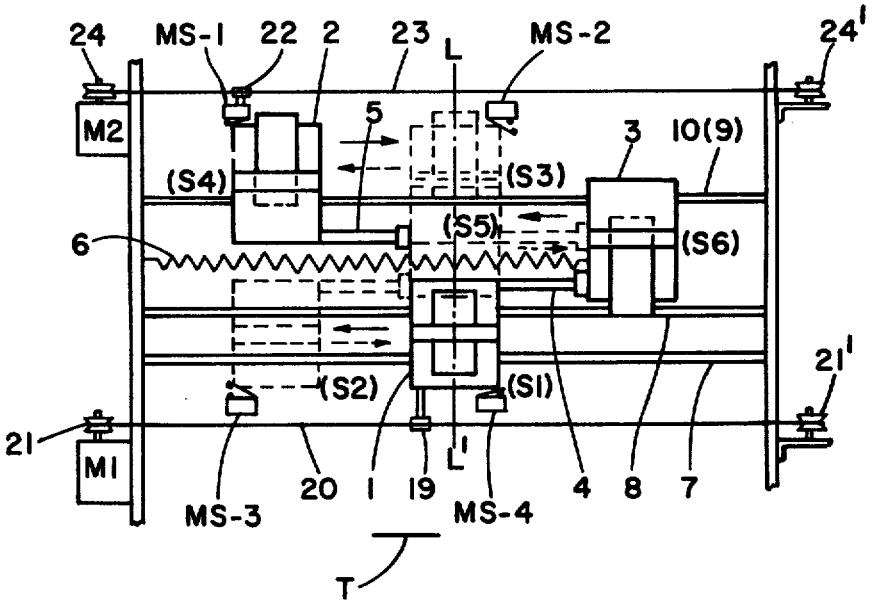
FIG. 4 is a plan view of FIG. 3.

In FIGS. 3 and 4, there are shown at 4 and 5 the aforementioned stops, and at MS-1, MS-2, MS-3 and MS-4 are shown microswitches (supported by means not shown) operable to detect lenses 1 and 2 in their respective retracted positions S2, S4 or in their respective operative positions S1, S3. These micro-switches are connected in a circuit (shown in FIG. 5) for energizing and de-energizing motors M1 and M2.

Operation of device T will now be described with reference to the motor circuit diagram of FIG. 5. As shown there, SW-1, SW-2, SW-3a, and SW-3b are selecting switches for lenses 1, 2 and 3 which may be operated by respective push buttons (not shown). These switches are used to apply line voltage from a supply (not shown) across motor M1 and/or motor M2.

Figure 5:
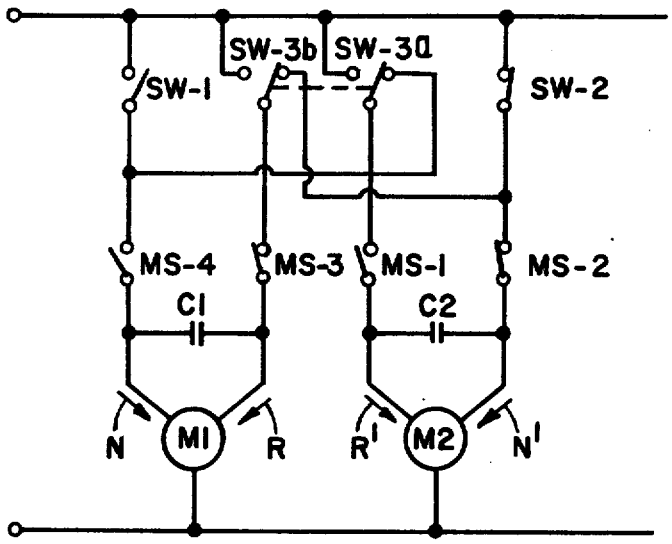
FIG. 5 is a control circuit diagram for drive motors of the lens selection device.

The switch conditions shown in FIG. 5 are those which exist when lens 2 has just been selected (by actuation of the appropriate push button) to be shifted from its retracted position S4 to its operative position S3. At this moment, lens 1, which had been previously selected, is in its operative position S1; lens 3 is in its retracted position S6; micro-switches MS-1 and MS-4 are open; and micro-switches MS-2 and MS-3 are closed. Switch SW-2 having been closed (by the above-mentioned push-button actuation) to shift lens 2, motor M2 rotates in a normal direction (between current flows through micro-switch MS-2 to motor M2 in the direction indicated by arrow N') to move lens 2 to its operative position S3. Motor M1 rotates in a reverse direction (because current flows through micro-switch MS-3 and switch SW-3b to motor M1 in the direction as indicated by arrow R) to shift lens 1 to its retracted position S2. When lens 1 arrives in retracted position S2 and lens 2 arrives in its operative position S3, the micro-switches MS-2 and MS-3 open whereupon the motors M1 and M2 cease to rotate.

To position lens 3 next in its operative position S5, an appropriate push button (not shown) is depressed to transfer the movable contacts of switches SW-3a and SW-3b. Micro-switch MS-1 is closed since selected lens 2 has been placed in its operative position, as described above. Hence, motor M2 rotates in a reverse direction (because current flows through switch SW-3a and micro-switch MS-1 to motor M2 in the direction indicated by arrow R') to shift lens 2 to its retracted position S4 where it opens micro-switch MS-1, thus stopping rotation of motor M2. When lens 2 shifts to its retracted position S4, lens 3 is shifted to its operative position S5 by the action of spring 6, following lens 2 as the latter moves away from its operative position S3.

Similarly, if switch SW-1 is subsequently selected (closed) for shifting lens 1 to its operative position, the selection (closure) of switch SW-1 causes motor M1 to rotate in a normal direction (because currenf flows through switch SW-1 and the closed micro-switch MS-4 to motor M1 in the direction indicated by arrow N). When lens 1 arrives in its operative position, micro-switch MS-4 opens and motor M1 ceases its rotation.

As is apparent from the foregoing, according to one embodiment of the present invention, the device T uses three lenses of differing magnifying power, shiftable to operative positions in such fashion that an improved optical performance is obtained. Since three lenses are mutually shifted to vary the magnification attained by use of the device, the lens assemblies can be accommodated in a space just large enough for the three lenses and their holders in both positions, unlike the aforementioned known device that requires a lens accommodation space corresponding to a width of five lenses for exclusively selecting any one of the three lenses. Only two drive means (motor driven mechanisms) are used to shift three lenses, because one of the lenses is shifted by a spring to follow the other lenses in the manner explained above. This arrangement keeps the overall size of the device compact and keeps the device mechanically simple.

What is claimed is:

1. A lens selection device including three magnification lenses each movably disposed [in a direction perpendicular to a single reference axis] and adapted to be shifted to a respective operative position [on the reference axis], characterized in that:

two of the lenses are each adapted to be shifted by separate drive means while the third of the three lenses is provided with means to follow the [movements] *movement of at least one* of the aforesaid lenses, said third lens being movable in response to particular [movements] *movement of at least one* of the aforesaid two lenses, whereby a desired one of the three lenses can assume an operative position [on the reference axis].

2. A lens selection device including first, second and third magnification lenses each having a principal axis and being mounted for movement in an associated path [perpendicular] *relative* to its principal axis, each lens being shiftable along the associated path between a retracted and an operative position, each lens when in its operative position being disposed in an optical path, first drive means coupled to the first lens to shift it as desired, second drive means coupled with the second lens to shift it as desired, the third lens being provided with means effective to cause the third lens to follow the other lenses when either of them are shifted so that the third lens (1) assumes its operative position when the other lenses are in their retracted positions and (2) assumes its retracted position when one of the other lenses assumes its operative position, whereby a desired one of the three lenses can be positioned in its operative position.

3. A lens selection device including first, second, and third magnification lenses each having a principal axis and each being shiftable along a respective, fixed path between respective retracted and operative positions, each lens when in its operative position intersecting a respective, spatially fixed reference axis that coincides with the principal axis of the lens, first drive means coupled to the first lens and selectively operable to shift it between its retracted and operative positions, a second drive means coupled to the second lens and selectively operable to shift it between its retracted and operative positions, and follower means coupled with the third lens and selectively co-operating *at least* with the first [lens, the] *or* second lens [or both of them,] the follower means being effective to shift the third lens from its retracted position to its operative position when one of the other lenses shifts to its retracted position but the remaining one of the lenses stays in its retracted position.

4. The device of claim 3 wherein the third lens is in its retracted position when the first lens or the second lens is in its operative position.

5. The device of claim 3 wherein the follower means includes a spring urging the third lens to its operative position.

6. The device of claim 3 wherein the follower means includes a stop connected to the first lens and engageable with the third lens to keep the third lens in its retracted position when the first lens is in its operative position, the follower means also including a stop connected to the second lens and effectively engageable with the third lens to keep the third lens in its retracted position when the second lens is in its operative position.

7. The device of claim 3 wherein both drive means are simultaneously operable (1) to shift the first lens to its operable position and the second lens to its retracted position, and alternatively (2) to shift the second lens to its operative position and the first lens to its retracted position.

8. The device of claim 3 wherein the reference axis associated with each lens is not coincident with the reference axes associated with the other lenses.

9. The device of claim 3 wherein the reference axis associated with each lens is coincident with the reference axes associated with the other lenses.

10. A lens selection device comprising, in combination, at least three magnification lenses, each lens forming part of an assembly supported for movement along a respective fixed path from/to a position wherein the lens is retracted to/from a position wherein the lens is operative; a plurality of drive means for effecting said movement of the assemblies, there being one less drive means than there are assemblies, each assembly being coupled to a respective one of the drive means except for a particular assembly, each drive means being selectively operable to shift the assembly coupled thereto between the retracted and operative positions; follower means coupled to the aforesaid particular assembly and being operable to shift the particular assembly between the retracted and operative positions thereof in response to movement of any one of the other assemblies from the operative and retracted positions associated therewith; and control means for the drive means adapted to mutually exclusively select a chosen one of the assemblies for shifting into the operative position thereof, said follower means being effective to position the particular lens assembly in the operative position thereof in the absence of selection of any of the assemblies coupled to a drive means.

*11. A lens selection device comprising a pair of first lenses each of which is movable between operative and retracted positions, drive means for moving each of said first lenses between its operative and retracted positions, a second lens movable between an operative and a retracted position and means motivated by the movement of a first lens toward an operative position for moving said second lens to its retracted position and responsive to the dispositions of both said first lens in their retracted positions for locating said second lens in its operative position.*

*12. The lens selection device of claim 11 wherein the operative and retracted positions of each of said first and second lenses is respectively in and out of registry with a respective predetermined optical axis.*

* * * * *